(12) United States Patent
Kauffman

(10) Patent No.: US 7,630,710 B2
(45) Date of Patent: Dec. 8, 2009

(54) MESSAGE TRANSMISSION IN ONBOARD AND OFF BOARD AIRCRAFT COMMUNICATIONS NETWORKS

(75) Inventor: Donald C. Kauffman, Laurel, MD (US)

(73) Assignee: Honeywell International, Inc., Morristown, NJ (US)

( * ) Notice: Subject to any disclaimer, the term of this patent is extended or adjusted under 35 U.S.C. 154(b) by 448 days.

(21) Appl. No.: 11/553,182

(22) Filed: Oct. 26, 2006

(65) Prior Publication Data
US 2008/0102824 A1 May 1, 2008

(51) Int. Cl.
*H04W 4/00* (2009.01)
(52) U.S. Cl. .................. 455/431; 340/945; 340/963; 340/531
(58) Field of Classification Search ............. 455/431; 340/945, 531, 963; 244/118.5
See application file for complete search history.

(56) References Cited

U.S. PATENT DOCUMENTS

| | | | | |
|---|---|---|---|---|
| 6,676,078 | B2 * | 1/2004 | Cordina et al. ......... | 244/118.5 |
| 6,725,035 | B2 * | 4/2004 | Jochim et al. ........... | 455/431 |
| 6,816,087 | B2 * | 11/2004 | Lane ....................... | 340/945 |
| 6,917,863 | B2 * | 7/2005 | Matos ..................... | 701/16 |
| 6,972,694 | B2 * | 12/2005 | Carroll ..................... | 340/963 |
| 7,113,109 | B2 * | 9/2006 | Cordina et al. ........... | 340/945 |
| 7,142,854 | B1 * | 11/2006 | Kauffman et al. ........ | 455/431 |
| 7,328,012 | B2 * | 2/2008 | Ziarno et al. ............. | 455/431 |
| 2004/0195449 | A1 | 10/2004 | Cordina et al. | |
| 2004/0245409 | A1 | 12/2004 | Cordina et al. | |
| 2006/0157619 | A1 * | 7/2006 | Cordina et al. .......... | 244/118.5 |
| 2006/0183474 | A1 * | 8/2006 | Ziarno et al. ............. | 455/431 |

FOREIGN PATENT DOCUMENTS

| | | |
|---|---|---|
| GB | 2393614 | 3/2004 |
| WO | WO 2004087500 | 10/2004 |

OTHER PUBLICATIONS

International Searching Authority, "International Search Report", Oct. 20, 2008, Published in: WO.

\* cited by examiner

*Primary Examiner*—David Q Nguyen
(74) *Attorney, Agent, or Firm*—Fogg & Powers LLC

(57) ABSTRACT

A method for transmitting one or more messages over a secure communications network is disclosed. The method involves receiving the one or more messages from a plurality of message sources at a management unit within the secure communications network, the one or more messages protected with information security and authorizing each message for display at a display point. The method further involves transmitting each of the messages to a plurality of communication end points throughout the secure communications network and relaying at least one response through the management unit.

19 Claims, 2 Drawing Sheets

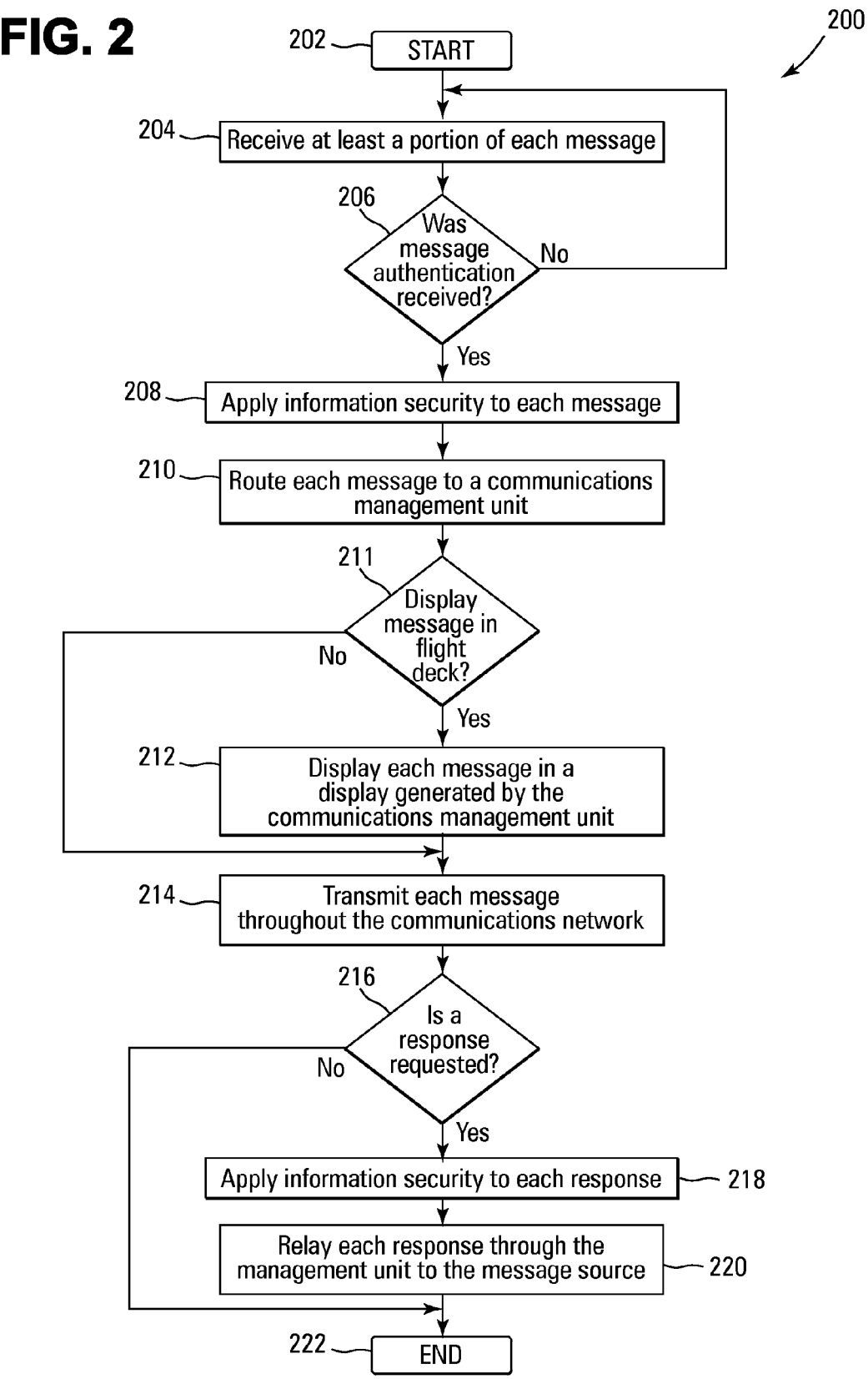

US 7,630,710 B2

MESSAGE TRANSMISSION IN ONBOARD AND OFF BOARD AIRCRAFT COMMUNICATIONS NETWORKS

RELATED APPLICATION

Figure 1:
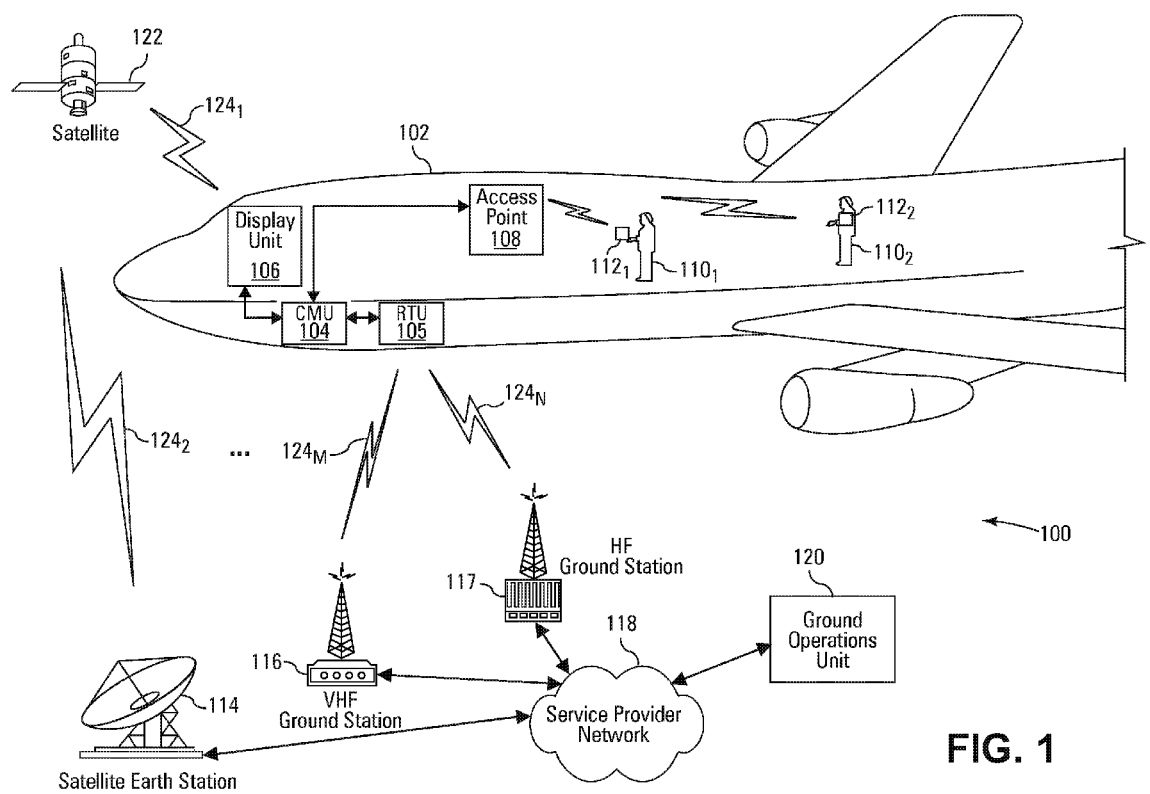

This application is related to commonly assigned U.S. patent application Ser. No. 10/646,925, filed on Aug. 25, 2003 and entitled "IN-FLIGHT COMMUNICATIONS SYSTEM" (the '925 application). The '925 application is incorporated herein by reference.

BACKGROUND

Recently, aircraft personnel have become more diligent on commercial aircraft in view of increased security measures in transportation and public safety. To be effective in these roles, the aircraft personnel require the capability to communicate with one another, with the aircraft flight deck personnel and systems (that is, onboard communications), and with flight command and control center personnel and systems on the ground (that is, off board communications). These message transmissions (data and voice messages) are preferably made in a secured and covert mode. This is especially desirable for those aircraft personnel who expect to remain discrete during particular situations.

Additionally, pilots and ground crew require consistent and uncompromised (that is, secure) access to the contents of the message transmissions during these particular situations. These messages transmissions require information security protection. Information security protection provides at least one of: (1) authentication that a message originator is as claimed; (2) that the message is transmitted with integrity (that is, the message has not been modified during transmission); and (3) that the message is confidential, meaning that it cannot be read by those for whom it is not intended. Further uses for the same system could include, for example, requests for flight information such as an arrival gate number, international security (customs) declaration requirements, passenger information for connecting flight(s), and the like.

SUMMARY

The following specification addresses message transmission in onboard and off board aircraft communications networks. Particularly, in one embodiment, a method for transmitting one or more messages over a secure communications network is provided. The method involves receiving the one or more messages from a plurality of message sources at a management unit within the secure communications network, the one or more messages protected with information security and authorizing each message for display at a display point. The method further involves transmitting each of the messages to a plurality of communication end points throughout the secure communications network and relaying at least one response through the management unit.

DRAWINGS

These and other features, aspects, and advantages will become better understood with regard to the following description, appended claims, and accompanying drawings where:

FIG. 1 is a block diagram of an embodiment of an onboard and off board aircraft communications system; and FIG. 2 is a flow diagram illustrating an embodiment of a method for transmitting one or more messages in the aircraft communications system of FIG. 1.

DETAILED DESCRIPTION

FIG. 1 is a block diagram of an embodiment of an onboard and off board aircraft communications system 100. System 100 comprises an airplane 102 in communication with at least one of a satellite 122 and a satellite earth station 114, a VHF ground station 116, an HF ground station 117, and at least one ground operations unit 120. In an example embodiment of FIG. 1, the at least one ground operations unit 120 represents a plurality of communication end points for off board communications. The satellite earth station 114, the VHF ground station 116, the HF ground station 117, and the at least one ground operations unit 120 are in communication with a service provider network 118. In an alternate embodiment, the satellite earth station 114, the VHF ground station 116, and the HF ground station 117 are in direct communications with the at least one ground operations unit 120.

The airplane 102 further comprises a communications management unit (CMU) 104, at least one radio transceiver unit (RTU) 105 responsive to the CMU 104, at least one access point 108 responsive to the CMU 104, and flight staff members $110_1$ and $110_2$ equipped with personal communications devices (PCDs) $112_1$ and $112_2$, respectively. It is understood that system 100 is capable of accommodating any appropriate number of flight staff members 110 and PCDs 112 (for example, one or more flight staff members 110 with at least one PCD 112) for onboard communications in a single airplane 102. The airplane 102 further includes a display unit 106 in communication with the CMU 104. The CMU 104 integrates display information with existing flight deck display information in the display unit 106. In one implementation, the CMU 104 is a communications management function (CMF) that resides on an integrated avionics processing platform of the aircraft 102.

In an example embodiment of FIG. 1, the flight staff member $110_1$ represents an air marshal possessing the PCD $112_1$. In the same embodiment, the flight staff member $110_2$ represents a flight attendant possessing the PCD $112_2$. The PCDs $112_1$ and $112_2$ represent, without limitation, conventional communication devices comprising personal digital assistants (PDAs), wireless devices (for example, mobile phones), pagers, voice-activated transceivers, and fobs. Each PCD 112 is preferably configured such that each flight staff member 110 sends and receives messages in an inconspicuous manner without attracting any unnecessary attention.

In operation, the system 100 transmits one or more messages originating from the personal communication devices 112 over a secure communications network. Each message comprises one of a voice message (that is, a voice pattern) and a conversion of a voice message into textual data from the PCD $112_2$, a real-time text message (that is, a data pattern) from the PCD $112_1$, a visual image from one of the PCDs 112, and the like. In an example embodiment of FIG. 1, the secure communications network of system 100 includes a typical Aircraft Communications Addressing and Reporting System (ACARS) comprising the CMU 104, the VHF ground station 116, the HF ground station 117, the satellite 122, the satellite earth station 114, the service provider network 118 and the at least one ground operations unit 120. The addition of the at least one access point 108 and the one or more personal communication devices 112 enhances message transmission for the ACARS of FIG. 1.

The system 100 protects each message with information security after receiving the messages from one or more of the PCDs 112. In one implementation, each message includes at least one key phrase (keyword) that authenticates each message from a particular PCD 112. The at least one key phrase (keyword) prevents any misuse of the particular PCD 112. Prior to each transmission, the particular PCD 112 applies information security to each message using one or more standard information security methods supported by the secure communications network of system 100 and further discussed in the '925 application. The one or more standard information security methods supported by the secure communications network of system 100 comprise at least one of source authentication, message integrity verification, and message encryption (decryption). In one implementation, the secured messages are routed from the particular PCD 112 to one or more wireless networking access points (similar to the at least one access point 108) within the aircraft 102 and then to the CMU 104. In similar implementations, routing the secured messages from the at least one access point 108 to the CMU 104 is accomplished with at least one of a wired communication interface and a wireless communication interface.

The CMU 104 receives the secured messages in at least one message broadcast form. In an example embodiment of FIG. 1, the at least one message broadcast form includes, without limitation, a text message, an image message, and a voice message. Each of the PCDs 112 permit a current user (that is, one of the flight staff members 110) to limit access to each secured message in the display unit 106. Moreover, each secured message is sent directly to at least one of the ground operations unit 120 and one or more of the flight staff members 110 that are not in the flight deck of the aircraft 102. The ability to limit access to each secured message (while transmitting the secured message through the CMU 104) is beneficial in one or more situations where an unauthorized individual is present on the flight deck of the aircraft 102. In one implementation, each PCD 112 translates a code word (phrase) within the message using voice recognition. The code word (phrase) is meaningful only to one or more intended users (for example, only one of the flight staff members 110). Once each secured message is authorized for display in the flight deck of the aircraft 102, the display unit 106 combines a message display for each secured message with the existing flight deck display in the aircraft 102.

Once each secured message is received, the CMU 104 transmits each secured message as an outbound message (that is, a data downlink) with the at least one RTU 105 to at least one of the satellite 122 and the ground station 114 over data transmission links $124_1$ and $124_2$, the VHF ground station 116 over a data transmission link $124_M$, and the HF ground station 117 over a data transmission link $124_N$ (as illustrated in FIG. 1). The satellite earth station 114, the VHF ground station 116, and the HF ground station 117 issue (relay) transmissions of each outbound message between the at least one RTU 105 and at least one ground operations unit 120 through the data transmission links $124_1$ to $124_N$. It is understood that system 100 is capable of accommodating any appropriate number of data transmission link 124 (for example, one or more data transmission links 124) in a single system 100. In one or more implementations, the at least one ground operations unit 120 responds to a source of the outbound message (that is, one or more of the PCDs 112) with a return acknowledgement and, in one or more instances, the at least one ground operations unit 120 issues a response as an inbound message (that is, a data uplink) to the one or more PCDs 112. The at least one ground operations unit 120 comprises, without limitation, a flight operations center, a service provider network hub, an air traffic control center, a law enforcement center, and a homeland security operations center. In one implementation, the secured message originates from the at least one ground operations unit 120 to one or more additional secure communications networks outside of the aircraft 102. Moreover, the at least one ground operations unit 120 does not wait for any data downlinks to occur before sending any data uplinks.

The CMU 104 routes all message transmissions authorized for display to a display point (for example, the display unit 106). The CMU 104 removes the information security (for example, decrypts the secured message) and prepares the message for display by the display unit 106. The display unit 106 displays all authorized messages from the one or more PCDs 112. The one or more PCDs 112 are capable of sending and receiving a plurality of secured messages, including covert and emergency response messages, both within the aircraft 102 (for example, between the display unit 106 and the flight staff members 110) and outside the aircraft 102 (for example, between the CMU 104 and the at least one ground operations unit 120). The message transmissions provided by the system 100 are suitable for simultaneous transmission between multiple aircraft (similar to the aircraft 102) from the at least one ground operations unit 120 over additional networks (similar to the secure communications network of system 100).

FIG. 2 is a flow diagram illustrating a method 200 for transmitting one or more messages over the secure communications network of the system 100. Beginning at block 202, the method 200 receives at least a portion of each message at block 204 from one of a plurality of message sources (for example, the PCD $112_1$). The method 200 addresses secure message transmissions (that is, one or more message transmissions protected with information security) over an existing aircraft communications system (for example, the ACARS components of system 100) to inform and alert users of potential adverse situations and to request specific information in addition to existing aircraft communications processing.

In one implementation (and as discussed above with respect to FIG. 1), at least one keyword (key phrase) authenticates each message from the PCD $112_1$ at block 206 before the PCD $112_1$ applies information security to each message at block 208. At block 210, the method 200 routes each secure message through the at least one access point 108 to the CMU 104. In the same implementation, if the flight staff member $110_1$ authorizes display of the confidential message on the display unit 106 (block 211), the CMU 104 removes the information security from each secure message in order to properly display the message at block 212. The display unit 106 combines the display of each secure message with an existing flight deck display in the aircraft 102. In one implementation, the display unit 106 acts as a message input device (for example, a keyboard) and applies information security to one or more direct responses to the PCD $112_1$. At block 214, the at least one RTU 105 transmits each secure message to the satellite earth station 114 (via the satellite 122), the VHF ground station 116, the HF ground station 117, the service provider network 118, and the at least one ground operations unit 120 before continuing at block 216. The at least one ground operations unit 120 is capable of removing the information security from each secure message in order to interpret the contents of the message.

In one implementation, the at least one ground operations unit 120 acknowledges that each secure message was received and (if block 216 determines that a response is requested) applies information security to each response (at block 218). The at least one ground operations unit 120 relays each secure response through the CMU 104 to the message source (the PCD $112_1$) at block 220. In one or more alternate implementations, the at least one ground operations unit 120 is an alternate message source, and each alternate message is routed to the PCD 112₁ through the CMU 104. Similarly, the at least one ground operations unit 120 applies information security to each alternate message. The display unit 106 displays each alternate secure message (once the information security is removed locally at the CMU 104) if authorized by the at least one ground operations unit 120.

While the methods and techniques described here have been described in the context of a fully functioning aircraft communications system, apparatus embodying these techniques are capable of being distributed in the form of a computer readable medium of instructions and a variety of forms that apply equally regardless of the particular type of signal bearing media actually used to carry out the distribution. Examples of computer readable media include recordable-type media, such as a portable memory device, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular aircraft communications network.

This description has been presented for purposes of illustration, and is not intended to be exhaustive or limited to the form (or forms) disclosed. Variations and modifications may occur, which fall within the scope of the embodiments described above, as set forth in the following claims.

What is claimed is:

1. A method for transmitting one or more messages over a secure communications network, the method comprising:
   receiving the one or more messages from a plurality of message sources at a management unit within the secure communications network, the one or more messages protected with information security;
   selectively withholding message existence and content from display at an intermediary display point based on the information security;
   transmitting the one or more messages through the management unit to a plurality of communication end points positioned throughout the secure communications network via one or more data transmission links; and
   relaying at least one response through the management unit.

2. The method of claim 1, and further comprising transmitting the one or more messages through the management unit from one or more of the plurality of communication end points.

3. The method of claim 1, wherein receiving the one or more messages from the plurality of message sources comprises:
   authenticating each message based on at least one of a voice-activated key phrase and a data-activated keyword; and
   routing each message through one or more access points.

4. The method of claim 1, wherein selectively withholding message existence and content from display at the intermediary display point further comprises limiting access to each message at the intermediary display point, wherein the intermediary display point comprises an existing display responsive to the management unit.

5. The method of claim 1, wherein relaying the at least one response comprises responding to each message from at least one of the intermediary display point and one or more of the communication end points.

6. A computer readable medium comprising program instructions, the program instructions operable to cause at least one programmable processor in at least one communications management unit and integrated avionics processing platform hosting the communications management function of an aircraft to:
   receive a secure message from one of a plurality of personal communication devices;
   selectively withholding existence and content of the secure message at an intermediary display point in the aircraft flight deck;
   transmit the secure message over one or more communications networks within the aircraft, through the communications management unit, and to one or more ground operations units outside the aircraft via one or more data transmission links; and
   wherein the at least one communications management unit receives one or more secure responses for selective transmission to the plurality of personal communication devices.

7. The program product of claim 6, wherein the instructions operable to selectively withhold the existence and the content of the secure message at the intermediary display point in the aircraft flight deck cause the at least one programmable processor to determine whether or not to withhold the existence and content of the secure message based on information included in the secure message and circumstances in the aircraft flight deck.

8. The program product of claim 6, wherein the instructions operable to selectively withhold the existence and the content of the message at the intermediary display point cause the at least one programmable processor to continue transmission of the secured message in situations where the secure message is not intended for display on the aircraft flight deck.

9. The program product of claim 6, wherein the instructions operable to transmit the secure message cause the at least one programmable processor to respond to the secure message from the aircraft flight deck.

10. An electronic system, the system comprising:
   at least one personal communications device that transmits and receives a plurality of messages protected with information security, the at least one personal communications device resident on an aircraft;
   one or more access points in communication with the at least one personal communications device;
   a communications management unit responsive to the one or more access points and operable to receive the plurality of messages protected with information security, the communications management unit further operable to transmit the plurality of messages protected with information security via one or more data transmission links;
   a display unit in communication with the communications management unit and responsive to the plurality of messages protected with information security in addition to existing aircraft communications processing, wherein the existence and content of messages are selectively withheld from display based on the information security; and
   at least one ground operations unit responsive to a data downlink based on the at least one of the plurality of messages protected with information security originating from the at least one personal communications device.

11. The system of claim 10, and further comprising the messages protected with information security originating from the at least one ground operations unit for receipt by the communications management unit as a data uplink.

12. The system of claim 10, wherein the at least one personal communications device is one of a wireless communications device and a voice-activated transceiver.

13. The system of claim 10, wherein the at least one personal communications device authenticates each message prior to application of the information security protection.

14. The system of claim 13, wherein the at least one personal communications device authenticates each message based on at least one of a voice-activated key phrase and a data-activated keyword.

15. The system of claim 10, wherein the one or more access points comprise one or more wireless networking access points within the aircraft.

16. The system of claim 10, wherein the communications management unit limits viewing access on the display unit to the plurality of messages as authorized by the at least one personal communications device.

17. The system of claim 10, wherein the at least one ground operations unit is further responsive to at least one radio transceiver in communication with the communications management unit.

18. The system of claim 10, wherein the at least one ground operations unit transmits the data uplink to a plurality of personal communication devices on multiple aircraft.

19. The system of claim 10, wherein the at least one ground operations unit comprises one of a flight operations center, a service provider network hub, an air traffic control center, a law enforcement center, and a homeland security operations center.

* * * * *

UNITED STATES PATENT AND TRADEMARK OFFICE
CERTIFICATE OF CORRECTION

PATENT NO. : 7,630,710 B2  Page 1 of 1
APPLICATION NO. : 11/553182
DATED : December 8, 2009
INVENTOR(S) : Donald C. Kauffman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 491 days.

Signed and Sealed this

Second Day of November, 2010

David J. Kappos
*Director of the United States Patent and Trademark Office*